July 4, 1933.　　　　G. E. HOWARD　　　　1,916,668

METHOD AND APPARATUS FOR CONDITIONING MOLTEN GLASS

Filed July 25, 1929

Witness:
G. A. Duberg

Inventor;
George E. Howard
by Bunn & Packam
Attorneys.

UNITED STATES PATENT OFFICE

GEORGE E. HOWARD, OF BUTLER, PENNSYLVANIA, ASSIGNOR TO HARTFORD-EMPIRE COMPANY, OF HARTFORD, CONNECTICUT, A CORPORATION OF DELAWARE

METHOD AND APPARATUS FOR CONDITIONING MOLTEN GLASS

Application filed July 25, 1929. Serial No. 380,929.

My invention relates to methods of and apparatus for conditioning molten glass to prepare the same prior to supplying it to apparatus for making glassware. More particularly my invention relates to a method of and apparatus for circulating molten glass in a melting tank or furnace.

In the preparation of molten glass, the mixed batch is fed into the melting end of a suitable tank or furnace where it is melted by intense heat. The molten glass then flows into the refining end of the tank and thence into suitable forehearths or boots from which it is supplied to glassware forming machines. As the glass flows through the tank, portions thereof stagnate and become cooler than other portions; consequently, the relatively cooler stagnated or dead portions of the glass undergo certain undesirable changes in character; the glass devitrifies. These chilled and devitrified portions of the glass are caused, as by variation in the pull on the furnace, to mix with the homogeneous hotter glass and produce cords and other undesirable imperfections therein which, in turn, cause defects and blemishes in the glassware which is made from the mixture of the hot and the cooled or devitrified glass.

It is an object of my invention to provide a novel method and novel apparatus for overcoming the above-mentioned difficulties by causing the glass to circulate in the tank in such a manner as to prevent stagnation and cooling of portions thereof. For the accomplishment of this object, a circulation may be set up in the glass in a direction different from the direction of movement of the glass toward the discharge openings in the refining end of the tank, and transversely of the path of travel of said glass. Such circulation of the glass tends to prevent undesirable changes in the character of the glass.

Another object of my invention is to provide a novel method and novel apparatus by the employment of which the surface portions and/or the glass at low levels in the body thereof, are caused to circulate in different directions from the directions of movement of other portions thereof through the refining end of the tank and toward the discharge openings. As a result, the various portions of the glass are mixed and kept homogeneous and undesirable changes therein are avoided.

A further object of my invention is to provide a novel method and novel apparatus for circulating the glass in the refining end of a tank to prevent stagnating and cooling thereof, and for returning portions of the glass to the melting end where they are blended and interfused with the newly melted glass. This insures that any glass which may be unduly cooled, will be reheated to the desired degree.

Other objects and advantages of the invention will be pointed out in the detailed description thereof which follows or will be apparent from such description.

In order that my invention may be readily understood, reference should be had to the accompanying drawing in which I have depicted means invented by me, by which the method of my invention may be practiced; but it will be understood that my novel method may likewise be employed in other furnace or tank constructions.

In said drawing:

Fig. 3 is a view in horizontal sectional top plan of a modification of the construction shown in Figs. 1 and 2; and Fig. 4 is a view in longitudinal vertical section taken on the line 4—4 of Fig. 3.

Figure 1:
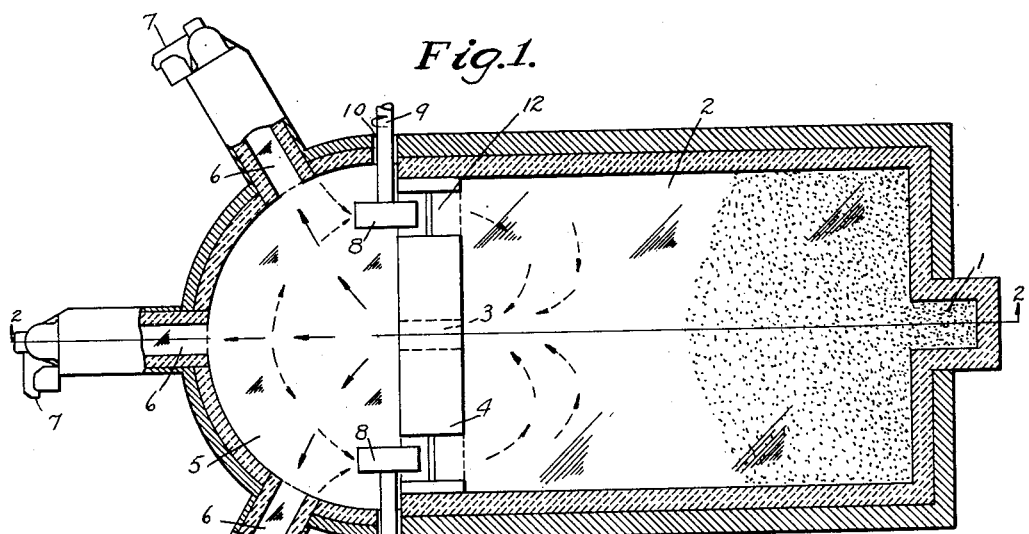
Figure 1 is a view in top plan of a glass melting tank embodying my invention and provided with means for circulating the glass therein.
Figure 2:
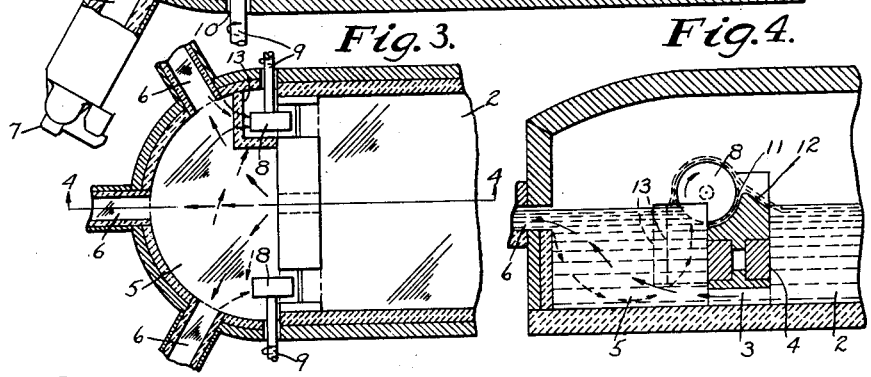
Fig. 2 is a view in vertical longitudinal section taken on the line 2—2 of Fig. 1.
Figure 2:
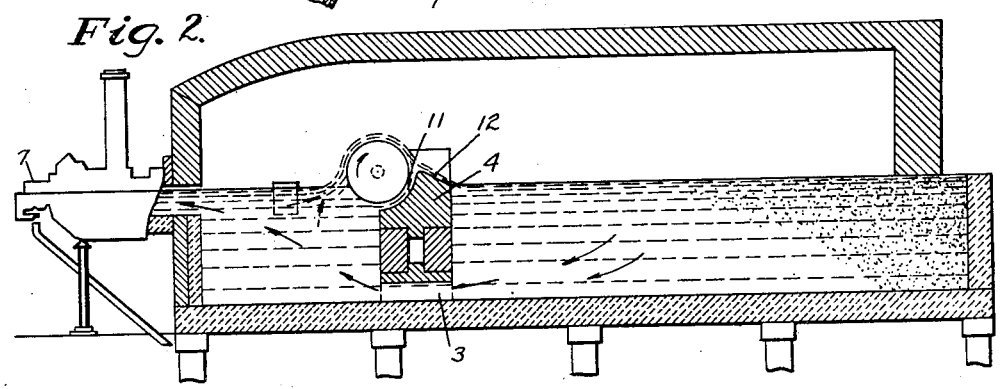

In carrying out the method of my invention in a tank such as is shown in Figs. 1 and 2, the glass batch is melted in the melting end, and flows into the refining end of said tank through an opening or throat in the bottom of the partition or bridge wall. From the outlet end of the throat, the glass flows toward and into the forehearths connected to the refining end, from which forehearths the glass is supplied to suitable forming machines. Circulation of the glass in the refining end is produced by rotary impellers located near the side walls of the tank and near the ends of the bridge wall. These impellers serve to return streams of glass to the melting end through channels in the bridge wall.

In the employment of the construction shown in Figures 3 and 4, portions of the glass at low levels are drawn upwardly through a vertical passage formed adjacent one of the impellers and returned by said impeller to the melting end of the tank.

Referring to the drawing:

The numeral 1 designates the doghouse of the tank through which the glass batch is supplied to the melting end 2. The batch is melted by heat generated in the tank in suitable known manner. The molten glass flows through a throat 3 in the bottom of the bridge wall 4 into the refining end 5 of the tank, thence outwardly and upwardly toward and into the various forehearths 6 in paths indicated approximately by the solid arrows in the various figures. The bridge wall may extend upwardly to a height slightly above the level of the glass to permit hot gases to pass from the melting end to the refining end of the tank. The forehearths may be adapted to supply glass to suitable glass feeding mechanisms designated generally at 7 which operate to feed the glass in gobs to suitable forming machines not shown; or said forehearths may be adapted to supply glass to the molds of suction gathering machines, as will be understood.

Located near the side walls of the refining end of the tank and adjacent the ends of the bridge wall 4 are impellers 8. These impellers are supported on suitable shafts 9 extending through, but spaced from, openings 10 in the side walls. Said impellers may be of any suitable character but preferably are of hollow construction to permit a cooling medium to be circulated therethrough and consist of refractory material. The impellers are rotated by suitable driving mechanism (not shown) and in a direction to cause glass to be drawn thereby through and from the refining end of the tank and returned to the melting end thereof.

The impellers 8 are located adjacent to and cooperate with special passageways formed in the top of the bridge wall. These passageways are preferably formed as shown in Figs. 2 and 4 by cutting away the upper portions of the wall and inserting therein a block of special high quality refractory material, such for example, as that disclosed in the patent to P. G. Willetts, No. 1,605,885, and shaped as shown, to provide a dam or crest slightly above the normal glass level and having a forward face curved as at 11 to correspond with the curvature of the impeller and a backward downwardly sloping surface 12 over which glass may flow back into the melting end of the tank. The impeller head is mounted sufficiently far from the surface 11 to assure the free rotation thereof, but sufficiently close thereto that the crest or dam will act partially as a scraper to remove glass brought forward by the rotation of the head and direct it down the sloping surface 12. Thus the glass constantly picked up by the rotating heads of the impellers is moved over the dams and down the inclined surfaces 12 into the tank where this glass, being somewhat cooler than the glass in the melting portion, tends to sink below the upper surface of the glass and to interfuse with the newly melted glass. When this glass is thus reconditioned, it again passes through the throat into the refining end.

As shown approximately by the dotted arrows in the various figures, the impellers cause circulation of the glass in the refining end of the tank from near the center of the tank toward the impellers in paths which cross the paths of travel of the glass which is moving toward the forehearths, or discharge openings, the last-named paths of the glass being shown approximately by the solid arrows, as already stated. As a result, stagnation and cooling of the glass and changes in the character (as devitrification) thereof will be prevented.

As will be understood, the effective depth of the circulatory action of the impellers will depend partially upon the extent to which they are immersed in the glass. The extent of immersion of the impellers in the glass may be varied as desired. The impellers serve, not only to produce a very desirable circulation of the glass in the refining end of the tank, but also to return portions thereof to the melting end, as previously stated. Thus the glass may be circulated in substantially closed paths outwardly or forwardly through the throat and inwardly or rearwardly through the channels 10.

In some instances it may be desirable to induce circulation of the glass in the lower levels of the glass more positively or strongly than may be accomplished by the construction shown in Figs. 1 and 2. To this end, a wall or baffle such as is shown at 13, Figs. 3 and 4, may be provided. This wall or baffle extends downwardly to a level above the bottom of the tank to provide an opening and is joined to the side wall and bridge wall, as shown. A strong circulation of the glass toward and beneath the bottom of the wall 13 from the lower levels of the glass will be effected by the associated impeller as shown approximately by the dotted arrows in Figs. 3 and 4. The impeller also will operate to draw the glass upwardly through the passage formed between the baffle and the side and bridge walls, the glass thereupon being discharged through channel into the melting end of the tank, as previously described. Baffles such as shown at 13 may be associated with both impellers, but if only one of the impellers has a baffle associated therewith, the other of said impellers will operate substantially in the manner previously described. As will be obvious, if baffles are provided adjacent both impellers, the circulation of the glass through the lower levels thereof will be correspondingly increased.

Various changes may be made in the details of construction of the illustrated embodiments of the invention and in the performances of my novel method, without departing from the principles thereof as defined in the appended claims.

Having thus described my invention what I desire to claim and to secure by Letters Patent is:

1. The method of circulating glass in a melting tank which comprises, establishing a flow of glass through the refining end thereof toward a discharge opening, and drawing a current of glass through the refining end of said tank in a path transverse to and crossing the path of the flow of the glass toward the discharge opening.

2. The method of circulating glass in a melting tank which comprises, establishing the flow of a plurality of streams of glass toward discharge openings in the refining end of the tank, and creating a plurality of currents transverse to and crossing said streams of glass in the refining end of the tank.

3. The method of circulating glass in a melting tank which comprises, establishing a flow of glass in the refining end of the tank toward discharge openings, and drawing the glass in a plurality of currents along paths which extend transversely to and crossing the flow of glass toward the discharge openings.

4. The method of treating molten glass in a melting tank of the type in which the melting and refining ends are separated as by a bridge wall, which comprises conducting a stream of supply glass from the melting end to the refining end and thence toward a discharge opening in the refining end, and simultaneously causing a forced circulation of the glass between the refining end and the melting end in a stream separate from the supply stream.

5. The method of treating molten glass in a melting tank of the type in which the melting and refining ends are separated as by a bridge wall, which comprises conducting a stream of supply glass from the melting end to the refining end and thence toward the discharge opening in the refining end, and simultaneously causing forced circulation of a plurality of streams of glass separate from each other and from the supply stream, between the refining end and the melting end along paths located at the opposite sides of the supply stream.

6. The method of treating molten glass in a melting tank of the type in which the melting and refining ends are separated as by a bridge wall, which comprises conducting a stream of supply glass from the melting end to the refining end and thence toward a discharge opening in the latter, and simultaneously causing a forced circulation of glass from the refining end to the melting end in a stream by-passing the supply stream.

7. The method of treating molten glass in a melting tank of the type in which the melting and refining ends are separated as by a bridge wall, which comprises conducting a stream of supply glass from the melting end to the refining end at one level, and simultaneously causing a forced circulation of glass from the refining end to the melting end at a different level and in a stream independent of the supply stream.

8. The method of circulating glass in a melting tank which comprises establishing a flow of glass from the melting end to and through the refining end thereof and toward a discharge opening, and moving a stream of glass from the lowermost levels of the refining end of the tank to the melting end thereof.

9. The method of circulating glass in a melting tank which comprises drawing a stream of glass from the lowermost levels of the refining end thereof and discharging at least part of such stream of glass into the melting end of the tank.

10. A glass melting tank having a melting end and a refining end, a discharge opening formed in the refining end thereof, means for conducting glass from the melting end to the refining end of said tank and toward said discharge opening, and means for drawing the glass in the refining end in a path transverse to and crossing the path of movement of the glass toward said discharge opening.

11. A glass melting tank having a melting end and a refining end separated from each other, a discharge opening formed in the refining end of said tank, means for conducting glass from the melting end to the refining end of said tank, and toward said discharge opening, and an impeller located in the refining end of said tank near the side wall thereof for drawing glass in the refining end in a path transverse to the path of movement of the glass through the refining end toward said discharge opening.

12. A glass melting tank having a melting end and a refining end separated from each other by a bridge wall, a throat for conducting glass from the melting end to the refining end, a channel by-passing the bridge wall above the level of the throat, the ends of said channel communicating respectively with the melting and refining ends of the tank, and power means for impelling glass through said channel into the melting end of the tank.

13. A glass melting tank having a melting end and a refining end separated from each other by a bridge wall, means for conducting glass from the melting end to the refining end of said tank, a channel leading into the melting end of said tank, and means for circulating the glass in the refining end of said tank, and for returning a portion of the glass passing through the refining end to the melting end through said channel.

14. A glass melting tank having a partition therein which divides said tank into a melting end and a refining end, an opening in said partition for conducting glass from the melting end of said tank to the refining end thereof, and a channel formed in said partition for returning glass from the refining end to the melting end of said tank.

15. A glass melting tank comprising a melting end and a refining end, means for conducting glass from the melting end to the refining end of said tank, and means for causing movement of the glass from the lower levels of the glass in the refining end of the tank to the melting end thereof.

16. A glass melting tank comprising a melting chamber and a refining chamber, a bridge wall separating said chambers, a submerged throat formed in the bridge wall through which molten glass flows from the melting chamber into the refining chamber, a channel formed in the top of said bridge wall, a dam extending across said channel, the top of said dam being located above the level of glass in said chambers, and an impeller for causing glass to flow from the refining chamber through said channel and over said dam into the melting chamber.

17. A glass melting tank divided into two compartments, said compartments containing respectively a pool and a body of glass, a dam separating the pool and body of glass, a rotary circulator positioned in adhesive contact with the glass adjacent to the dam, said dam being cut away to permit the circulator to rotate closely adjacent thereto, and means for rotating the circulator to draw a stream of glass adhering to the circulator from the pool of glass in the one compartment, and to cause said glass to be removed from the circulator by the cooperation thereof with the dam, and discharged over the dam into the body of glass in the other compartment.

Signed at Butler, Pa. this 19th day of July 1929.

GEORGE E. HOWARD.